United States Patent [19]

Alderman et al.

[11] 4,112,286

[45] Sep. 5, 1978

[54] POWER CIRCUIT FOR INDUCTION HEATING

[75] Inventors: Arnold N. Alderman, Stratford, Conn.; Shashi B. Dewan, Toronto, Canada

[73] Assignee: Firing Circuits, Inc., Norwalk, Conn.

[21] Appl. No.: 700,601

[22] Filed: Jun. 28, 1976

[51] Int. Cl.² .............................................. H05B 5/04
[52] U.S. Cl. .............................. 219/10.41; 219/10.77; 323/21; 323/94 H; 363/57; 363/79; 363/96
[58] Field of Search ........................ 219/10.77, 10.49; 363/55, 56, 57, 58, 79, 96, 135, 136; 323/94 H, 21; 307/252 H, 252 K, 252 M

[56] References Cited
U.S. PATENT DOCUMENTS

| 3,320,518 | 5/1967 | Weiss | 323/94 H |
|---|---|---|---|
| 3,328,667 | 6/1967 | Shaneman | 363/136 |
| 3,406,327 | 10/1968 | Mapham | 363/135 |
| 3,448,367 | 6/1969 | Corey | 219/10.77 |
| 3,566,243 | 2/1971 | Landis | 363/96 |
| 3,814,888 | 6/1974 | Bowers et al. | 219/10.77 |
| 3,821,630 | 6/1974 | Kornrumpf et al. | 363/57 |
| 3,852,656 | 12/1974 | Bourbeau | 363/58 |
| 3,925,709 | 12/1975 | Mitchell et al. | 323/21 |
| 3,947,748 | 3/1976 | Klein | 363/57 |
| 3,999,113 | 12/1976 | McCoy | 363/55 |

Primary Examiner—Bruce A. Reynolds
Attorney, Agent, or Firm—Wooster, Davis & Cifelli

[57] ABSTRACT

A power circuit for use in billet heating, surface heat treating and melting and protective circuitry associated therewith. The power circuit generally comprises a source of potential in series with a pair of inductances and an inverter module. The inverter module has two sections each comprised of a thyristor in parallel with a diode. A pair of series connected charging capacitors are connected across the source of potential and a load is connected from between the capacitors to between the two sections of the inverter module. Current flows through one thyristor, through the load and charges the capacitors. The capacitors discharge and a reverse current flows through the load and through the corresponding diode. This cycle is repeated then with the opposite section of the inverter module. A commutation failure protection circuit is provided which detects the voltage collapse condition accompanying a short circuit through the inverter module and when this occurs, it acts to shut off the thyristors. An open load detect circuit is provided which senses the voltage build up which occurs when the load is open, and this circuit also acts to shut off the thyristors should this happen. The power circuit also has a peak power detect circuit which compares the phasing of the voltage and current and enables the circuit to maintain operation at maximum power by inhibiting any frequency increase when resonance operation is achieved.

10 Claims, 17 Drawing Figures

POWER CIRCUIT FOR INDUCTION HEATING

BACKGROUND OF THE INVENTION

This invention relates to a power circuit and protective circuitry associated therewith for use in billet heating as well as the surface heat treating or melting of a work piece which are induction heating operations.

In the prior art, these operations are performed in a variety of ways. Gas furnaces have been used, but they are generally unsatisfactory as they have a limited capacity, and they do not provide the critical amount of control over the conditions required with some of the processes. As a result of these limitations, certain power circuits have been employed in the prior art. These power circuits, however, also have several major drawbacks. The prior art power circuits are usually very complex and do not have suitable protection for the costly components which due to the high power application are not only very costly but also more likely to be subject to severe transients and failure conditions which could cause their destruction. Furthermore, most of the prior art power circuits are controlled by motor generators which do not provide an adequate mechanism for regulating the variation of power and the general operation of circuit. Nevertheless, despite the complexity of these power circuits and the lack of reliability along with the poor control characteristics they are widely used.

SUMMARY OF THE INVENTION

The improved power circuit according to the invention herein is less complex, more dependable and easier to regulate than the prior art power circuits. The improved power circuit basically comprises an inverter having a short circuit or commutation failure protective circuit, an open load protective circuit and a peak power detection circuit.

The inverter is the basic circuit and is comprised of a two-section inverter module in series with a pair of inductances and a source of DC potential. Each section of the inverter module is comprised of a diode connected in parallel with a silicon controlled rectifier or thyristor both of which serve as solid state switches. A pair of series capacitors is connected across the inverter module and the source of electrical potential. One side of a load which generally comprises a work piece surrounded by the coil is connected between the series capacitors while the other side of the load is connected through an inductance between the sections of the inverter module. The load may be separated from the circuit by a transformer.

The inverter circuit operates when one SCR is gated allowing current to pass from the source of DC potential through the SCR and through the load and finally charging the series capacitors. When this half cycle is complete, the capacitors discharge and a sinusoidal current flows back through the load and passes through the diode of the first inverter section. The second part of the cycle begins when the second SCR is fired by gating pulse. As the series capacitors have been recharged again, they discharge through the load and through the second SCR. When this portion of the cycle is complete, a return current goes back through the diode in the second section of the inverter module. In normal operation, the diodes have not stopped conducting before the SCRs are fired. This results in an overlap and an increased current through the system and the load. The entire cycle repeats until the work is complete.

In another embodiment of this invention, the sections of the inverter module can be altered somewhat depending upon the desired frequency range for operation of the power circuit. The frequency may depend upon the particular load and the process to be performed. At the higher frequencies, the solid state SCRs must turn off more quickly since both the SCRs and their respective sections of the inverter module cannot conduct at the same time or a short circuit through the inverter module results. The short circuit not only causes the current to bypass the load but because of the magnitude of the short circuit current, may also result in the destruction of the SCRs themselves. At the high voltages being used and high current levels, SCRs are not generally available with the required turn-off characteristics at the higher frequencies. Therefore, each inverter section may be comprised of a pair of SCRs in parallel with a pair of diodes with a central connection between the SCRs and the diodes. Another variation of this embodiment would be to connect only a single diode across the two SCRs in each inverter section thereby eliminating any dynamic sharing problem which might be created if the stored charge in the diode is not equal.

The power circuit has several protective circuits associated therewith, and one of these is the commutation failure circuit. A commutation failure occurs when the SCRs of both sections of the inverter module are conducting at the same time. The inverter module in effect becomes a short circuit. An LC circuit is set up with the combination of the series inductances and a filter capacitor across the power source. Under these conditions a very high current is passing through the SCRs which will repeat as the LC circuit rings. The SCRs cannot survive passing this high current repeatedly and SCR failure will result if the SCRs are not shut off under these conditions.

The commutation failure protection circuit, therefore, is used to sense the short circuit or commutation failure condition and when it does, it inhibits the logic sending gating pulses to the SCRs thereby turning the SCRs off. Specifically, the commutation failure protection circuit is connected across the filter capacitor which under normal operating conditions should have a voltage across it equal to the voltage of the DC source of $+E$. When a commutation failure occurs, the short circuit through the inverter module sets up the LC circuit with the filter capacitor and the series inductances which causes the circuit to ring. The filter capacitor charges and discharges, and the voltage across the filter capacitor will drop substantially from a $+E$ to zero and then down to $-E$ as the capacitor charges in the opposite polarity.

The commutation failure protection circuit is connected across the filter capacitor to sense this change in voltage. In one embodiment, a Hall effect device is used which isolates the logic circuitry of the protection circuit from the actual power circuit itself. The current into the Hall device is a function of and proportional to the voltage across the filter capacitor. The output voltage of the Hall device is proportional to this input current. When the voltage across the filter capacitor collapses, as it would in the case of a commutation failure, the current into the Hall device also decreases substantially, and there is a substantial decrease in the Hall device output voltage. The commutation protective circuit continually compares the output voltage of the Hall device with a set value, and if the Hall device output voltage falls below the set value, indicating commutation failure, the protective circuit inhibits the logic sending the gating pulses to the SCRs of the inverter module thereby turning them off. The SCRs become noncondutive and the short circuit is eliminated.

In another embodiment of the commutation failure protective circuit, an optical coupler is used instead of the Hall device. As with the Hall device, the optical coupler accomplishes a DC voltage transfer and still maintains the desired voltage isolation from the main power circuit. Again, as in the previous embodiment, the protective circuit is connected across the filter capacitor, and the current into the protective circuit is proportional to the voltage across the filter capacitor which under normal conditions should be constant and approximately equal to the source of potential +E. This input current passes through an input diode of an optical coupler which turns on the transistor of the coupler. The transistor is electrically isolated from the diode. The protective circuit continuously monitors the output voltage of the optical coupler transistor, which is at a low level when the power circuit is operating normally. This output voltage of the optical coupler is continually compared with a set value. With a commutation failure, the current into the diode of the optical coupler decreases as the voltage across the filter capacitor likewise collapses. The current through the input diode of the optical coupler thereby decreases, and the output voltage of the transistor of the optical coupler increases. When this output voltage goes above the set value it is being compared with by the protective circuit, the protective circuit inhibits the logic sending gating pulses to the SCRs of the inverter module thereby turning them off. The short circuit is eliminated.

The power circuit of this invention also has an open load protection circuit. The load is connected to the power circuit through a transformer having a primary and a secondary. The workpiece is generally connected across the secondary. If the connections on the secondary side are left open or become open during operation, the primary, having a very high impedance, is left in the power circuit. When the power circuit is operated under these conditions, the voltage builds up to such very high values across the SCRs and the diodes of the inverter module that these devices can be damaged or destroyed. This voltage, however, takes several cycles to build up to such a destructive level, and the open load circuit protection circuit detects this build up and shuts off the power circuit by inhibiting the gating pulses to the SCRs before they can be damaged. The open load protection circuit monitors the voltage across the secondary of the transformer connecting the load to the power circuit. The open load protection circuit reduces this voltage to logic level and full wave rectifies it. This voltage is then compared with threshold voltage above the normal operating voltage, but well below the voltage which would result in destruction of the devices. When the value of the voltage in the circuit exceeds the threshold voltage, the open load protection circuit inhibits the gating pulses to the SCRs thereby turning them off.

The power circuit also has a peak power detection circuit to enable it to operate at maximum efficiency and to provide maximum and automatic control of the operation of the device. Resonance is the optimum condition and this occurs where both the current and the voltage are in phase. The peak power detection circuit, therefore, is used to determine when this condition occurs, which is difficult in many cases as the load is dynamic and can change during the process which results in corresponding changes in the operation of the device. The peak power detection circuit detects the current on the primary side of the load transformer and the voltage on the secondary side. The peak power detection circuit separately integrates both these waveforms to obtain two series of pulses which are proportional to and in phase with the respective voltage and the current waveforms. The circuit the compares the respective pulsetrains and combines them so that the resulting width of the pulses from the output of the peak power detection circuit corresponds to the difference between the zero crossing of the current and the voltage. The greater the width of the output pulse, the greater the phase variation. The pulse is then integrated to generate the DC voltage proportional to the difference which is fed into a regulator which controls the power circuit itself.

Accordingly, a principle object of the present invention is to provide a power circuit for billet melting heat treating and melting which is simple and less complex than known circuits.

Another object of the present invention is to provide circuit protection for such a power circuit.

Another object of the present invention is to provide a means for controlling and regulating the power circuit.

Other and more specific objects of the invention will be in part obvious and will in part appear from the following description of the preferred embodiments and claims taken together with the drawings.

are not conducting at the same time since a thyristor may continue conducting even after the current zero crossover occurs unless a reverse voltage is applied. If the second SCR were to be fired before the first SCR were swept clean in this manner, a short circuit of the inverter module 40 could still occur. Once the first SCR is properly turned off, however, the forward blocking voltage across it will begin to build up as soon as the second SCR is fired.

Figure 8:
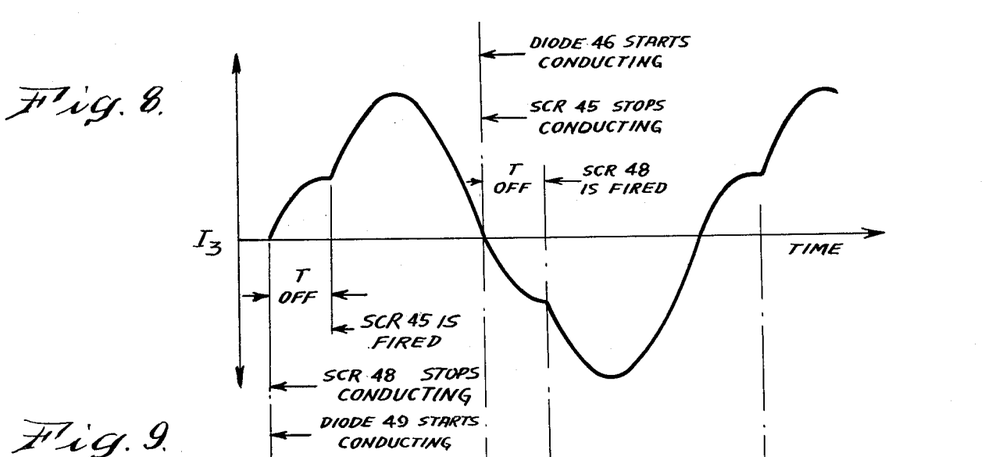
FIG. 8 is a graph of current versus time of a single cycle of the waveform of FIG. 7.
Figure 9:
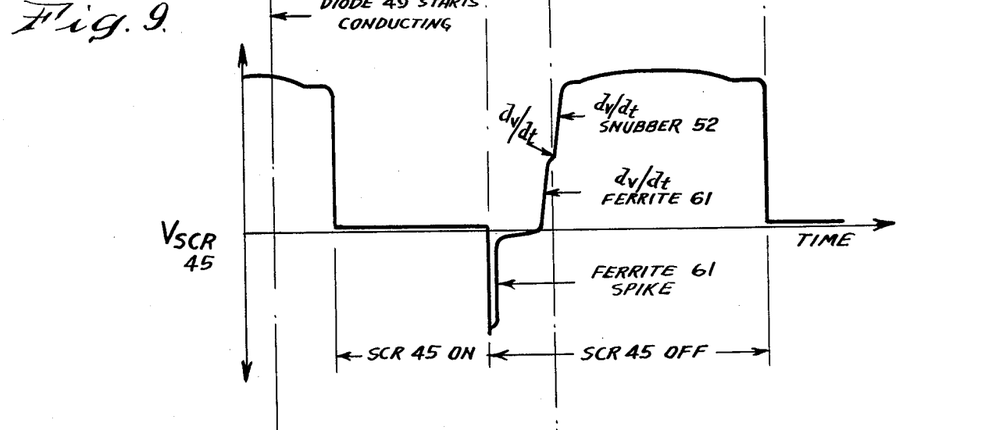
FIG. 9 is a graph of voltage across an SCR of one section of an inverter module versus time.
Figure 10:
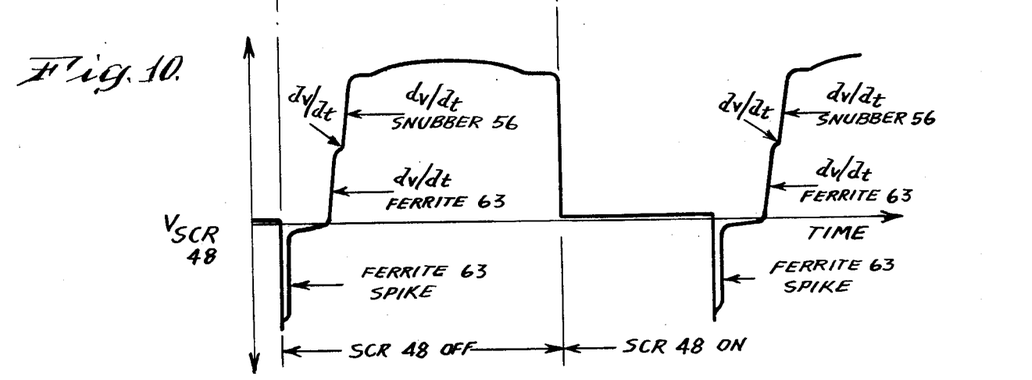
FIG. 10 is a graph of voltage across an SCR of another section of an inverter module versus time.

The graph of FIG. 10 represents the voltage across SCR 48 with respect to the same time scale as in the graph of FIGS. 8 and 9. By comparing the time when SCR 48 stops conducting, as indicated in FIG. 8, with the corresponding time in FIG. 10, it can be seen that the forward blocking voltage on SCR 48, $V_{SCR\ 48}$, has not built up any appreciable level until some time after SCR 48 stops conducting. Consequently, if the other SCR 45 is fired during this period when there is still essentially no forward blocking voltage on SCR 48, a short circuit would result in the inverter module 40. As indicated by a comparison of FIGS. 8 and 10, SCR 45 is not turned on until some time after SCR 48 stops conducting and when the voltage across SCR 48 is at a sufficient level to insure it is nonconductive. Similarly, as can be seen in a comparison of the graph of FIG. 8 with the graph of FIG. 9 which represents the forward blocking voltage across SCR 45, $V_{SCR\ 45}$, with respect to time, SCR 48 does not become conductive until the forward blocking voltage across SCR 45 has reached a sufficiently high level.

Figure 1:
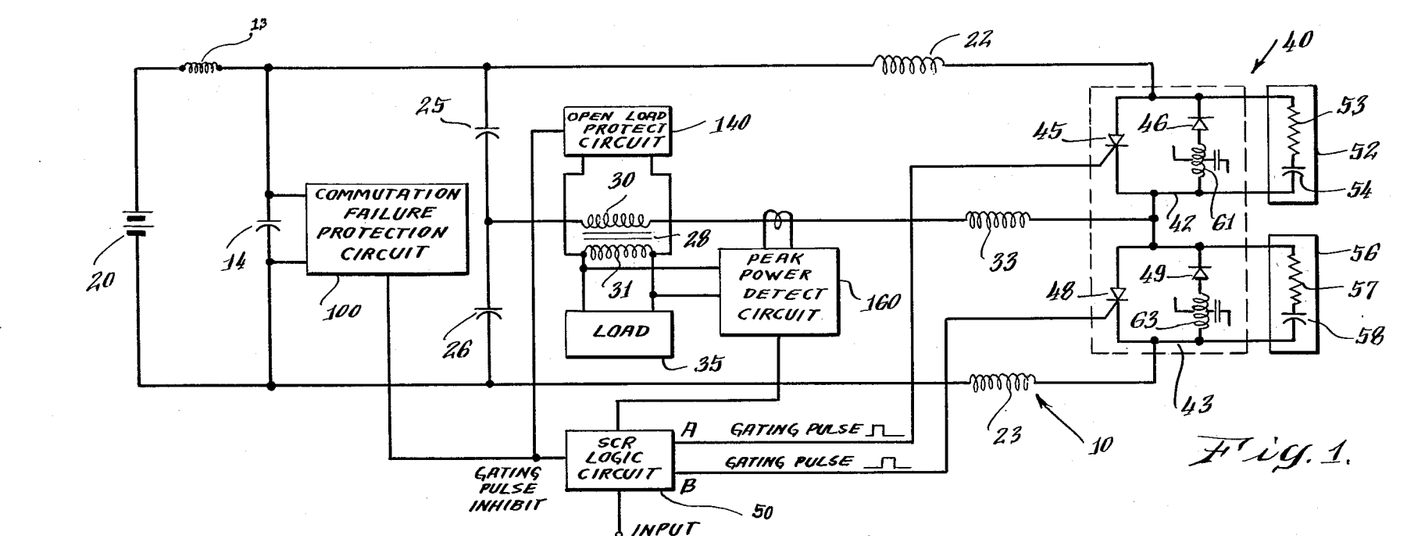
FIG. 1 is a circuit diagram showing the power circuit of this invention.

The rate of rise of the forward blocking voltage, $dv/dt$ for SCR 45, 48 is important due to another characteristic of the thyristors. If this voltage rises too rapidly, the SCR can become conductive once again and a short circuit will occur in the inverter module 40. As a result, this rate of rise, $dv/dt$, must be minimized. In order to accomplish this, a snubber 52, as shown in FIG. 1, is connected in parallel with the first inverter module section 42. The snubber 52 is comprised of a resistor 53 in series with a capacitor 54, and the snubber 52 limits the rate of rise $dv/dt$ of the forward blocking voltage across the SCR 45. Similarly, another snubber 56 comprised of a resistor 57 in series with the capacitor 58 is connected in parallel across the second section 43 of the inverter module 40. This snubber 56 also acts to limit the rate of rise of the forward blocking voltage across SCR 48.

As shown in FIG. 1, a first ferrite 61 or saturating reactor is connected in series with the diode 46 of the first section 42 of the inverter module 40. As soon as the diode 46 starts conducting, as shown in FIG. 8, the ferrite 61 applies a reverse voltage across the SCR 45 for a very short period of time. This is shown in FIG. 9 in the form of a sharp voltage spike of opposite polarity to the forward blocking voltage on SCR 45. This reverse voltage sweeps the SCR 45 clean thereby decreasing the turn off time of the SCR 45 substantially, and consequently, it enables the SCR 45 to be switched at a higher frequency.

A second ferrite 63 is connected in series with the diode 49 of the second section 43 of the inverter module 40. As shown in a comparison of the graphs of FIGS. 8 and 10, when diode 49 starts conducting, the ferrite 63 applies a reverse voltage across the SCR 48 for a very short period of time. The voltage spikes of the ferrite 63 are shown in FIG. 10. Similarly, this reverse voltage acts to sweep the SCR 48 clean, substantially reducing the time required for it to turn off and thereby enabling the SCR 48 to be switched at a higher frequency.

In addition to improving the switching times of the SCRs 45, 48, the ferrites 61, 63 perform a second function. At the higher frequencies for the operation of the power circuit 10 which sometimes approach 10 KHZ the capacitors 54, 58 of the respective snubbers 52, 56 must be very large in order to sufficiently limit the rate of rise of the forward blocking voltages across the SCRs 45, 48. Consequently, the current through the snubbers 52, 56 is very high. Under these conditions there is a substantial loss in power through these snubber resistors 53, 57. This is avoided with the use of the ferrites 61, 63 as they also act to limit the rate of rise of the forward blocking voltages. As indicated in FIG. 9, the rate of rise of the forward blocking voltage for SCR 45 is determined by the ferrite 61 until the ferrite 61 saturates. Similarly, the rate of rise as shown in FIG. 10 for the forward blocking voltage for the SCR 48 is determined by the ferrite 63. When ferrites 61, 63 saturate, all the current then passes through the snubbers 52, 56 and the rate of rise of the forward blocking voltages is determined by the snubbers 52, 56 alone, as indicated in the graphs of FIGS. 9 and 10. The ferrites 61, 63, therefore, provide a power saving as they cut the work of the snubbers 52, 56 under high power and high frequency operating conditions.

Figure 2:
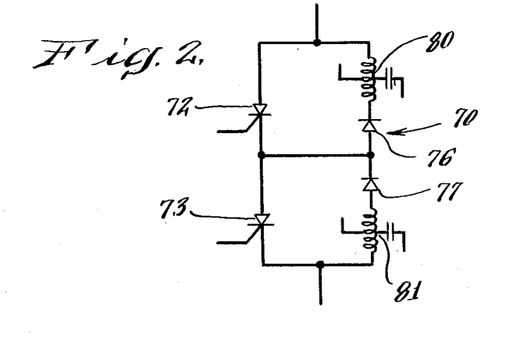
FIG. 2 is a circuit diagram of another embodiment of an inverter module section.

In another embodiment of this invention, an inverter module section 70, as shown in FIG. 2, is used. This inverter module section 70 is comprised of a pair of SCRs 72, 73 connected in series. A pair of series diodes 76, 77 are connected in parallel to the SCRs 72, 73. The diode 76 has a series connected ferrite 80 and the diode 77 has a series connected ferrite 81. There is also a connection from between the SCRs 72, 73 to between the diodes 76, 77, as shown in FIG. 2.

At the lower frequencies of operation of the power circuit 10, around 3 KHZ, thyristors are available which have the necessary rapid turn-off time and which are rated to operate at the very high voltages required. The voltage may be 1200 volts. However, at the higher frequencies of operation of the power circuit 10, around 10 KHZ, an SCR with an even quicker turn-off time is required. As there are few if any such devices which meet this design criteria for high power applications in the prior art, this inverter module section 70 is used for each section of the inverter module 40. The SCRs 72, 73 have a rapid turn-off time and, therefore, can operate at the higher frequencies. Although these SCRs 72, 73 could not carry all of the high voltage individually, they are arranged in this embodiment so that the total voltage is shared between them. Consequently, due to this voltage sharing effect, the inverter module section 70 of this embodiment can be employed in high power conditions at high frequencies. It should be noted that the SCRs 72, 73 would be triggered by the same pulse, and snubbers (not shown) would be connected in parallel with each of the SCRs 72, 73.

Figure 3:
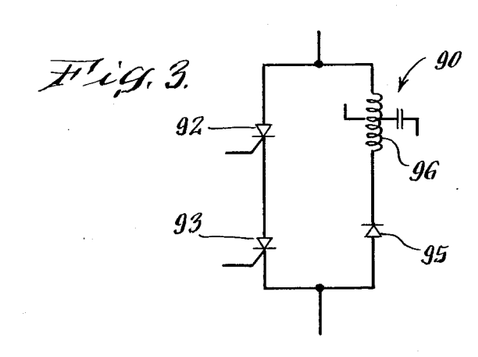
FIG. 3 is a circuit diagram of another embodiment of an inverter module section.
Figure 17:
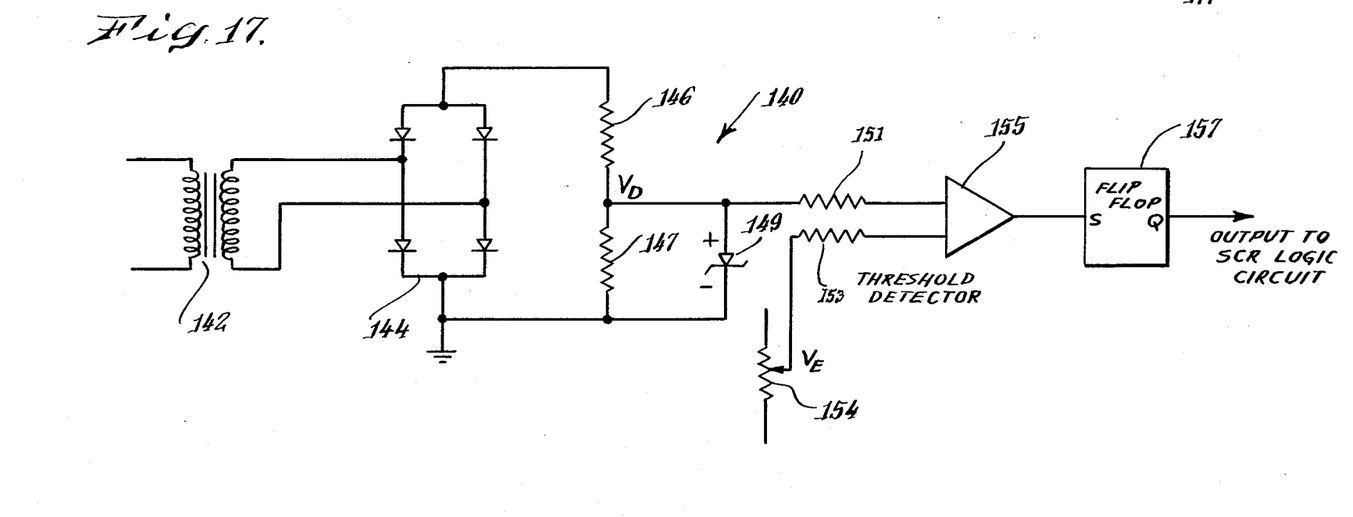

In another embodiment of this invention, an inverter module section 90, as shown in FIG. 3, is used for both sections of the inverter module 40. This inverter module section 90 is comprised of a pair of series connected SCRs 92, 93 in parallel with a diode 95 and a ferrite 96. As with the previous embodiment, this inverter module section 90 is used in high frequency applications where the SCRs 92, 93 share the voltage. Both SCRs 92, 93 would be gated at the same time in actual operation. The inverter module section 90 of this embodiment FIG. 17 is a circuit diagram of the open load protection circuit.

DESCRIPTION OF THE PREFERRED EMBODIMENTS

Referring now to FIG. 1, a power circuit according to the invention herein is shown at 10. The power circuit 10 comprises a source of electrical potential 20 in series with a first inductance 22, an inverter module 40 having a first section 42 and second section 43 and a second inductance 23. A first capacitor 25 and a second capacitor 26 are connected in series. The combination of the series capacitors 25, 26 are connected parallel to inverter module 40 between the inductances 22, 23 and the source of potential 20. A transformer 28 having a primary winding 30 and a secondary winding 31 is connected in the power circuit 10. One end of the primary winding 30 is connected between the series capacitors 25, 26 while the opposite end of the primary winding 30 is connected through a third inductance 33 to the inverter module 40. This connection to the inverter module 40 is made between the first section 42 and the second section 43, as shown in FIG. 1. A load 35 is connected across the secondary winding 31 of the transformer 28. Current through the primary winding 30 will induce a current in the secondary winding 31 which passes through the load 35.

The first section 42 of the inverter module 40 is generally comprised of a thyristor or silicon controlled rectifier 45 which is referred to as an SCR. The SCR 45 is in parallel with a diode 46. The second section 43 of the inverter module 40 is similarly comprised of an SCR 48 in parallel with a diode 49. As shown in FIG. 1, the first section 42 and the second section 43 of the inverter module 40 are connected.

Figure 4:
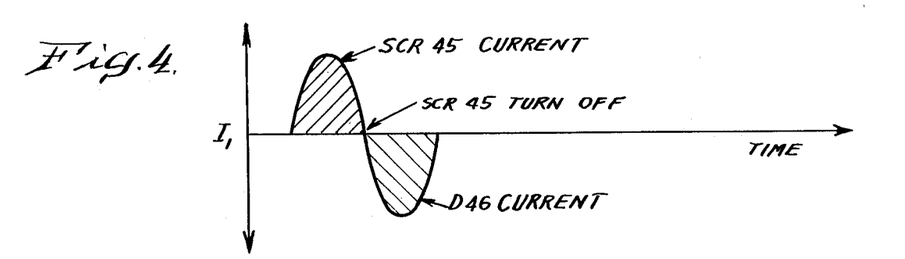
FIG. 4 is a graph of the waveform of current versus time for a first section of an inverter module.

The power circuit 10 operates in the following manner. With the power on, an SCR logic circuit 50 sends a gating pulse along the line designated A in FIG. 1 to the gate of the SCR 45 of the first section 42 of the inverter module 40. Due to the characteristics of the thyristor, the pulse turns SCR 45 "on" and the SCR 45 becomes conductive. Because of the LC aspects of the power circuit 10, a sinusoidal current is created. This current is referred to as $I_1$ for the first section 42 of the inverter module 40 and shown in FIG. 4. When SCR 45 is conductive, the positive cycle of this current $I_1$ flows through the first inductor 22 and through the now conductive SCR 45. This current then passes through the third inductance 33 and the transformer 28 to which the load 35 is attached. The current finally returns to both of the series capacitors 25, 26 thereby charging them.

Once the series capacitors 25, 26 become charged in this manner, the cycle reverses. The capacitors 25, 26 discharge sending the negative cycle of current $I_1$ through primary winding 30 of the transformer 28 and the third inductance 33. This return current then passes through the diode 46 of the first section 42 of the inverter module 40, as the SCR 45 has gone into nonconduction. Once a thyristor such as SCR 45 begins to conduct, it continues in conduction as long as a minimum sustaining current is passed. However, once the sinusoidal current $I_1$ reaches zero represented by the crossover point on FIG. 4, SCR 45 turns off and becomes nonconductive once again until a new pulse is sent from the SCR logic circuit 50.

This sinusoidal current $I_1$ must pass through the line to the load transformer 28 and back through the first section 42 of the inverter module 40. The two possible current paths of the second section 43 are not available as the SCR 48 has not yet received a gating pulse from the SCR logic circuit 50 and is, therefore, nonconductive and the diode 49, as configured, does not pass current in this direction.

Figure 5:
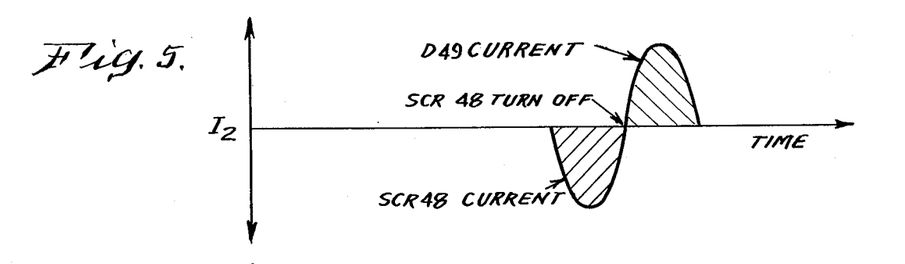
FIG. 5 is a graph of current versus time for a second section of an inverter module.

Sometimes after SCR 45 has become nonconductive again, the SCR logic circuit 50 sends a pulse along the line designated B in FIG. 1 to the gate of SCR 48 of the second section 43 of the inverter module 40. The negative cycle of sinusoidal current $I_2$ shown in FIG. 5 then flows from the combination of capacitors 25, 26 through the primary winding 30 of the load transformer 28 and the third inductance 33. This portion of the current $I_2$ then passes through the conductive SCR 48, and through the second inductance 23. This current then charges the series capacitors 25, 26. When current $I_2$ has dropped to zero, the capacitors 25, 26 discharge and send the positive cycle of the sinusoidal current $I_2$ back to the second section 43 of inverter module 40. As SCR 48 has turned off and become nonconductive when the current $I_2$ went to zero during the crossover, this positive cycle of the current $I_2$ flows through the diode 49. This current cannot pass through the first section 42 of the inverter module 40 as the SCR 45 is in its nonconductive state and the diode 46 is reverse biased and, therefore, nonconductive also. As a result, the current then passes through the line to the load transformer 28 and recharges the capacitors 25, 26 in the opposite polarity so that the current $I_1$ can again be created upon discharge of the capacitors 25, 26 and the entire operation repeated as to both sections 42, 43 of the inverter module 40.

Figure 6:
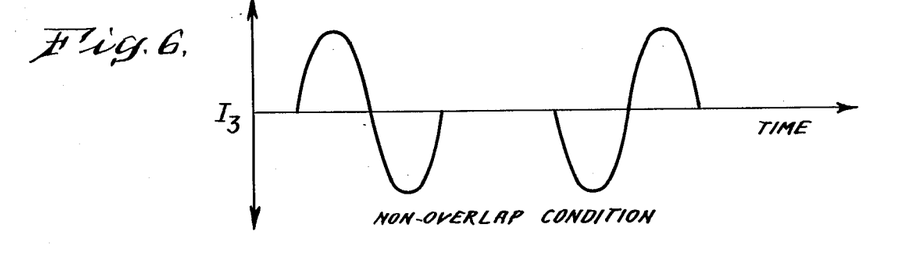
FIG. 6 is a graph of the current versus time of a power circuit operating in a nonoverlapped condition.

Depending upon the frequency of the gating pulses from the SCR logic circuit 50 to the SCRs 45, 48, the power circuit operates in either an overlap or nonoverlap mode. In the nonoverlapped condition, the diode in one section of the inverter module 40 has stopped conducting before the gating pulse is sent to the SCR in the opposite section. In this case, the total current through the power circuit 10 and the load 35 is referred to as $I_3$ and is shown in FIG. 6. Essentially, it is a combination of the currents $I_1$ and $I_2$ shown in FIGS. 4 and 5 respectively.

Figure 7:
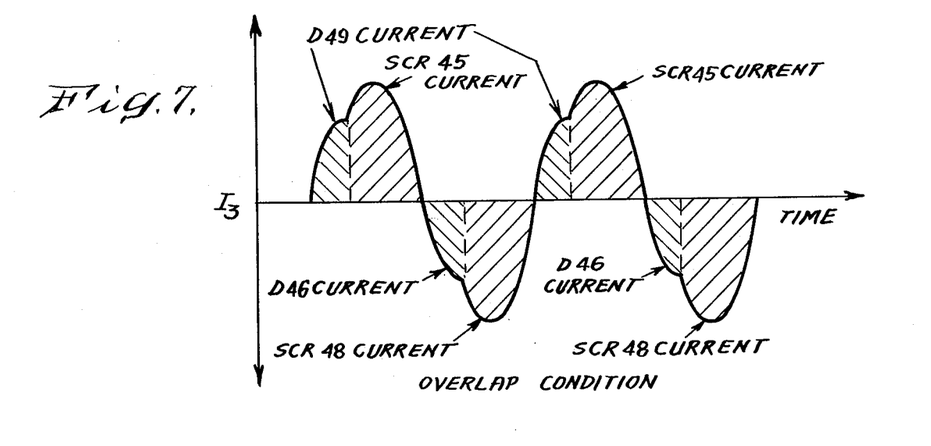
FIG. 7 is a graph of the current versus time when a power circuit is operating in an overlapped condition.

When the frequency of the gating pulses is increased, the power circuit 10 goes into an overlap mode of operation. The diode 49 of the second section 43 is still conducting when the SCR 45 of the first section 42 receives its gating pulse and is turned on. Similarly, the diode 46 of the first section is still conducting when the SCR 48 of the second section 43 receives its gating pulse. In this overlap mode, the waveform for current $I_3$ is shown in FIG. 7 and as can be seen, the overall magnitude of the current $I_3$ is greater in this mode of operation than in the nonoverlapped condition shown in FIG. 6 since $I_3$ results from the summing of the diode current and the SCR current of the opposite inverter module section.

It is important that the SCRs 45, 48 are not conducting at the same time as this would result in a short circuit through the entire inverter module 40 which could damage or destroy the devices. As indicated on the time graph of FIG. 8, SCR 48 will stop conducting at the current $I_3$ zero crossover point. There is a finite time labeled "T OFF" before the SCR of the opposite section, SCR 45, received its gating pulse and goes into conduction. Because of the turn-off characteristics of the thyristors, the fact that this delay, "T OFF", exists, however, is not sufficient to insure that the SCRs 45, 48 eliminates any dynamic voltage sharing problems which may develop in the use of the inverter module section 70 of the previous embodiment. In the previous embodiment, unequal sharing of the diode stored charge between the diodes 76, 77 might cause unequal sharing of the forward blocking voltage in the SCRs 72, 73. If this unbalance was of sufficient magnitude, it could damage or destroy at least one of the SCRs. This dynamic sharing problem, however, is eliminated with the inverter module section 90 of this embodiment as a single diode 95 is used. In actual operation, each SCR 92, 93, as well as the diode 95, would have a snubber which is not shown in the drawings.

The power circuit 10 has a filter capacitor 14 which is connected in parallel with the source of potential 20, and an inductance 13 which acts as a DC choke, as shown in FIG. 1. A commutation failure protection circuit 100 is connected across the filter capacitor 14. A commutation failure occurs when the SCR 45 and SCR 48 are conducting at the same time causing the inverter module 40 to become a short circuit. When this happens, the power circuit 10 itself essentially becomes an LC circuit formed by the combination of the series inductances 22, 23 with the filter capacitor 14. As a result of the ringing effect produced by this LC circuit in the power circuit 10 under the commutation failure conditions, a very high current passes through the SCRs 45, 48. As the circuit rings, this current will continually pass back and forth through the SCRs 45, 48 destroying or damaging them. The commutation failure protection circuit 100, therefore, is used to detect this condition, and when it is detected, the commutation failure protection circuit 100 inhibits the SCR logic circuit 50 sending the gating pulses to the SCRs 45, 48. The SCRs 45, 48 are shut off, and the short circuit through the inverter module 40 is eliminated.

Figure 13:
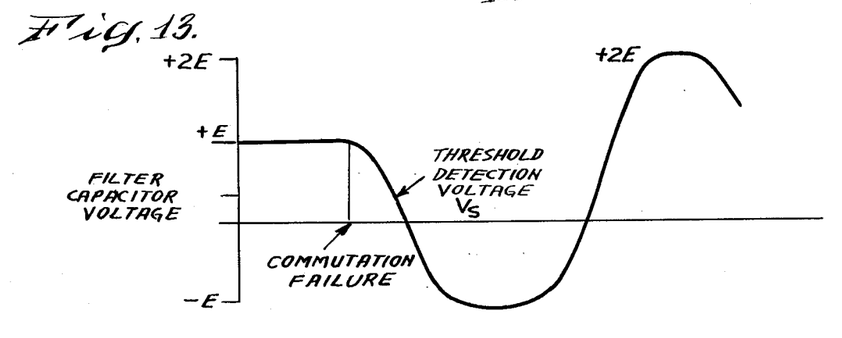
FIG. 13 is a graph of the voltage across the filter capacitor in a commutation failure condition versus time.

Under normal operating conditions, the voltage across the filter capacitor 14 is at a constant level which is approximately equal to the voltage of the source of potential 20. As shown in the graph of FIG. 13, this is the voltage $+E$. Upon commutation failure, the voltage across the filter capacitor 14 drops substantially as the capacitor 14 discharges in what has now become an LC circuit. The current flows through the inductances 22, 23 and back into the capacitor 14, eventually fully recharging the filter capacitor 14 in the opposite polarity or at a level of voltage equal to $-E$, as shown in FIG. 13. As the power circuit 10 continues to ring, the voltage climbs to $+2E$ value since the source of the potential 20 remains in the power circuit 10. Under these circumstances, a high current would repeatedly pass through the SCRs 45, 48 and they would be destroyed. The commutation failure protection circuit 100, therefore, senses a commutation failure or short circuit in the inverter module 40 by detecting this initial voltage collapse across the filter capacitor 14. Since the voltage of power circuit 10 is very high, however, it is undesirable to operate the logic circuitry of the commutation failure protection circuit 100 at that level. Therefore, in addition to detecting and being responsive to the voltage collapse situation, the commutation failure protection circuit 100 must at the same time isolate its logic circuitry from the actual power circuit 10 itself.

Figure 11:
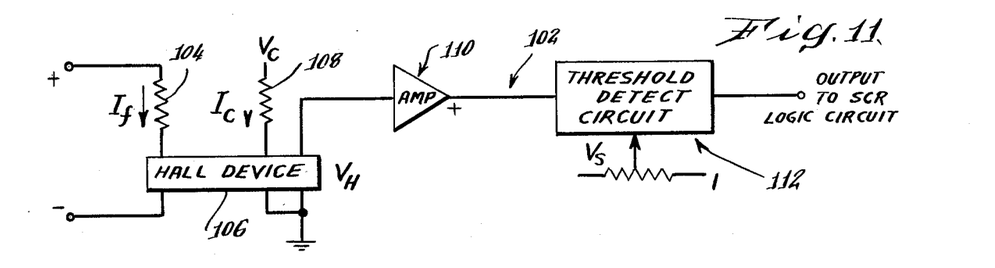
FIG. 11 is a circuit diagram of one embodiment of the commutation failure protective circuit.

One embodiment of the commutation failure protection circuit is shown at 102 in FIG. 11. As the circuit 102 is connected across the filter capacitor 14, the input current $I_f$ will be proportional to the voltage across the filter capacitor 14. The current $I_f$ passes through a limiting resistor 104 and into a Hall device 106. The Hall device 106 is a well-known device which is essentially comprised of a toroid with a section removed and the input current $I_f$ is actually passed through several windings around the toroid. A semiconductor is placed in the open section of the toroid and is thereby voltage isolated from the power circuit 10. The current $I_f$ passing through the winding causes a flux proportional to the magnitude of the current to be applied to the semiconductor. When a constant voltage $V_C$ is applied so that a constant current $I_C$ passes through a limiting resistor 108, and into the semiconductor of the Hall device 106, the output voltage $V_H$ of the semiconductor in the toroid under these conditions, is proportional to the input current $I_f$. This output voltage $V_H$ is the output voltage of the Hall device 106, and since $V_H$ is proportional to the input current $I_f$, it is also proportional to the voltage across the filter capacitor 14.

As shown in FIG. 11, the output voltage $V_H$ of the Hall device 106 is increased by an amplifier 110 and then applied to a threshold detect circuit 112. The threshold detect circuit 112 compares the voltage $V_H$ from the amplifier 110 with a comparison voltage $V_S$. When the amplified output voltage $V_H$ of the Hall device 106 falls below the comparison voltage $V_S$, the threshold detect circuit will then send a signal to the SCR logic circuit 50 inhibiting any further gating pulses to the SCRs 45, 48 of the inverter module 40. As the SCRs 45, 48 do not receive any gating pulses, they are turned off and go into nonconduction thereby eliminating the short circuit. As this occurs quickly with respect to the commutation failure, the SCRs 45, 48 are not damaged or destroyed. The value of $V_S$ can be selectively set at any value, but it is generally selected so that before $V_H$ falls below it the voltage across the filter capacitor 14 would be at a level substantially below the normal, as shown in the graph of FIG. 13.

Figure 12:
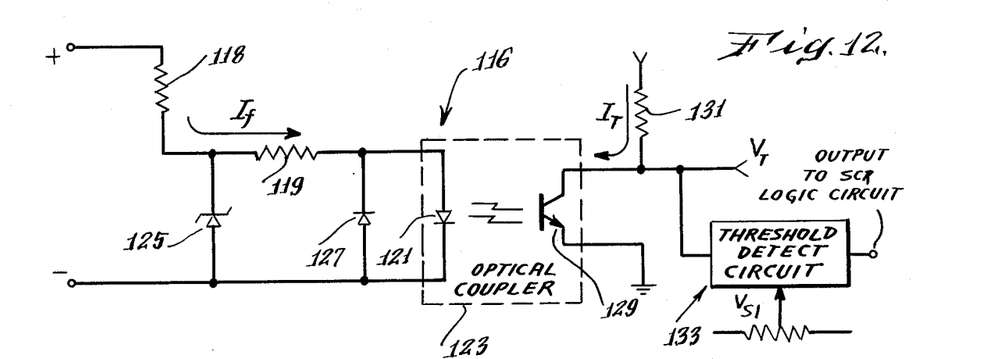
FIG. 12 is a circuit diagram of a second embodiment of the commutation failure protective circuit.

Another embodiment of a commutation failure protective circuit 116 is shown in FIG. 12. As in the previous embodiment, this commutation failure protective circuit 116 is connected across the filter capacitor 14, and the input current $I_f$ is directly proportional to the voltage across the filter capacitor 14. The current $I_f$ passes through a first resistor 118 and a second resistor 119 which reduces the magnitude of the current somewhat. The current $I_f$ then passes into an input diode 121 of an optical coupler 123. The optical coupler 123 has a transistor 129 which is electrically isolated from the input diode 121. However, the current $I_f$ through the input diode 121 will turn on the transistor 129. As a result, the output current $I_T$ of the transistor 129 will be directly proportional to $I_f$ and the output voltage $V_T$ of the transistor 129 will be inversely proportional to $I_f$. A pullup resistor 131 is connected to the emitter of the transistor 129 and the output from the emitter is sent to a threshold detect circuit 133. The threshold detect circuit 133 compares the voltage $V_T$ with a set voltage $V_{S1}$. When a commutation failure occurs, $I_f$ and $I_T$ decrease and $V_T$ increases. When the value of $V_T$ exceeds that of the comparision voltage $V_{S1}$, the threshold detect circuit 133 sends a signal to the SCR logic circuit 50 inhibiting further gating pulses to the SCRs 45, 48 thereby turning them off.

As shown in FIG. 12, a zener diode 125 is connected from between the first resistor 118 and the second resistor 119 to the opposite side of the filter capacitor 14 and the input diode 123. The zener diode 125 limits the current $I_f$ which can increase to a value determined by the zener diode 125. Any amount of current above this value will be shunted by the zener diode 125 and will not pass through the input diode 121. This prevents the input diode 121 from being damaged by excessive current. Similarly, a reverse current limiting diode 127 is connected in parallel across the input diode 121. The diode 127 will protect the input diode 121 of the optical coupler 123 by shunting the reverse voltage during a commutation failure.

An open load protection circuit 140 is used with the power circuit 10 of this invention. As shown in FIG. 1, the open load protection circuit 140 is connected across the secondary winding 31 of the load transformer 28 and operates to inhibit the gating pulses to the SCRs 45, 48 when it detects an open load condition. If the load 35 is not connected to the secondary winding 31 or becomes disconnected during the operation of the power circuit 10, there is a very high impedance across the primary winding 30 of the transformer 28. As a result, the voltage will build up after several cycles to such a very high level across the components of the inverter module 40 that the SCRs 45, 48 and the diodes 46, 49 may be damaged.

The open load protection circuit 140 employs this build up time to detect the open load condition and shut down the inverter module 40. As shown in FIG. 17, the open load protection circuit 140 is comprised of a transformer 142 which initially steps the voltage across the secondary winding 31 down to logic levels. The transformer 142 is connected to a full wave rectifier 144. A pair of resistors 146, 147 act as a voltage divider for the voltage from the full wave rectifier 144. The divided voltage $V_D$ from the resistors 146, 147 is applied through a limiting resistor 151 to a threshold detector 155. A zener diode 149 is connected across the resistor 147, and it serves to protect the threshold detector 155 by limiting the voltage $V_D$.

A potentiometer 154 is set at a voltage level $V_E$, and this voltage is also sent to the threshold detector 155 through a limiting resistor 153. The threshold detector 155 compares the voltage $V_D$ which is necessarily proportional to the voltage across the primary 30 of the load transformer 28 with the selected threshold detection voltage $V_E$. When $V_D$ exceeds the threshold detection voltage $V_E$, it indicates that the voltage across the primary 30 of the load transformer 28 has exceeded the normal operating level. The threshold detector 155 then switches and sets a flip flop 157. The output of the flip flop 157 is connected to the SCR logic circuit 50 and any further gating pulses to the SCRs 45, 48 of the inverter module 40 are inhibited. Because of the voltage build up time in an open load condition, the increased voltage can be detected when it is above normal but still below a level which would cause destruction of the devices.

Figure 14:
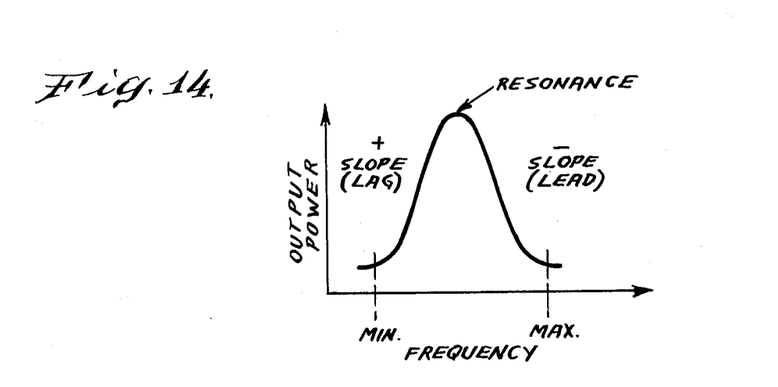
FIG. 14 is a graph of output power versus frequency for the power circuit.

As can be seen from the graph of FIG. 14, the output power from the power circuit 10 is greatest when the circuit is operating at resonance. Resonance occurs when the current and the voltage are in phase and, therefore, have the same zero crossover point. When the current reaches the zero crossover point ahead of the voltage, this is referred to as lead and indicated on the graph as the minus (−) slope. Conversely, when the voltage reaches the crossover point ahead of the current, this is the lag condition and is indicated by the plus (+) slope of the graph. In order to detect the peak or resonance condition, a peak power detect circuit 160 is connected to the power circuit 10, as shown in FIG. 1.

The peak power detect circuit 160 senses the current $I_L$ in the line to the primary winding 30 of the load transformer 28 and at the same time detects the voltage $V_L$ across the secondary winding 31 of the transformer 28. The peak power detect circuit 160 then compares the phasing of $V_L$ and $I_L$ and inhibits any frequency changes in the SCR logic circuit 50 if it detects that the circuit 10 is operating at resonance.

Figure 15:
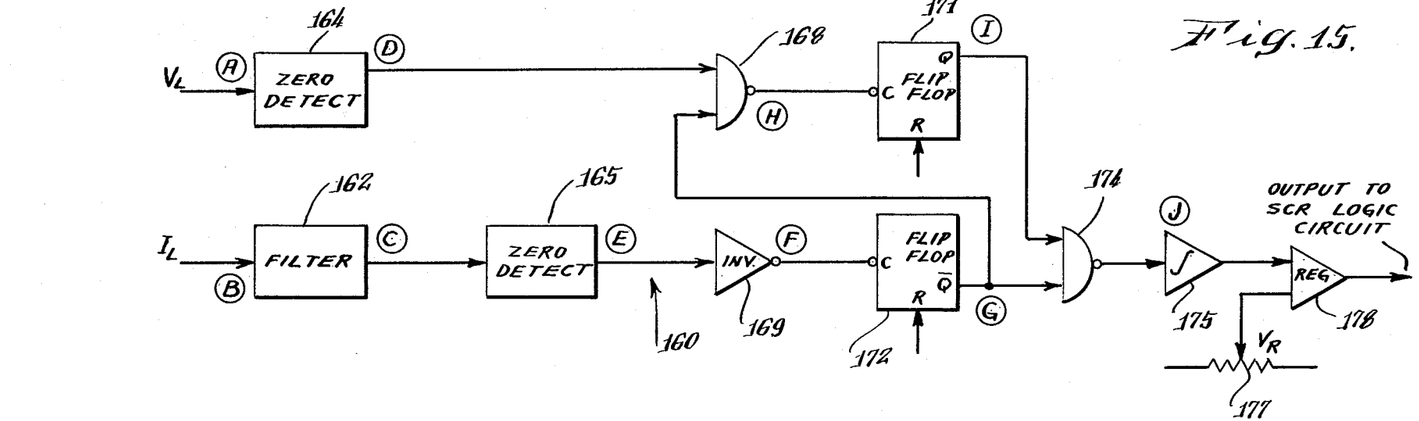
FIG. 15 is a circuit diagram of the peak power detection limit circuit.

The peak power detection circuit 160 is shown in FIG. 15. The voltage $V_L$ from the secondary 31 is reduced and fed into a zero detect circuit 164 which changes the sinusoidal voltage shown in graph A of FIG. 16 into the positive pulsetrain represented in graph D. As can be seen from FIG. 16, the zero crossover points of the voltage waveform $V_L$ correspond to the leading edges of the pulsetrain out of the zero detect circuit 164.

Figure 16:
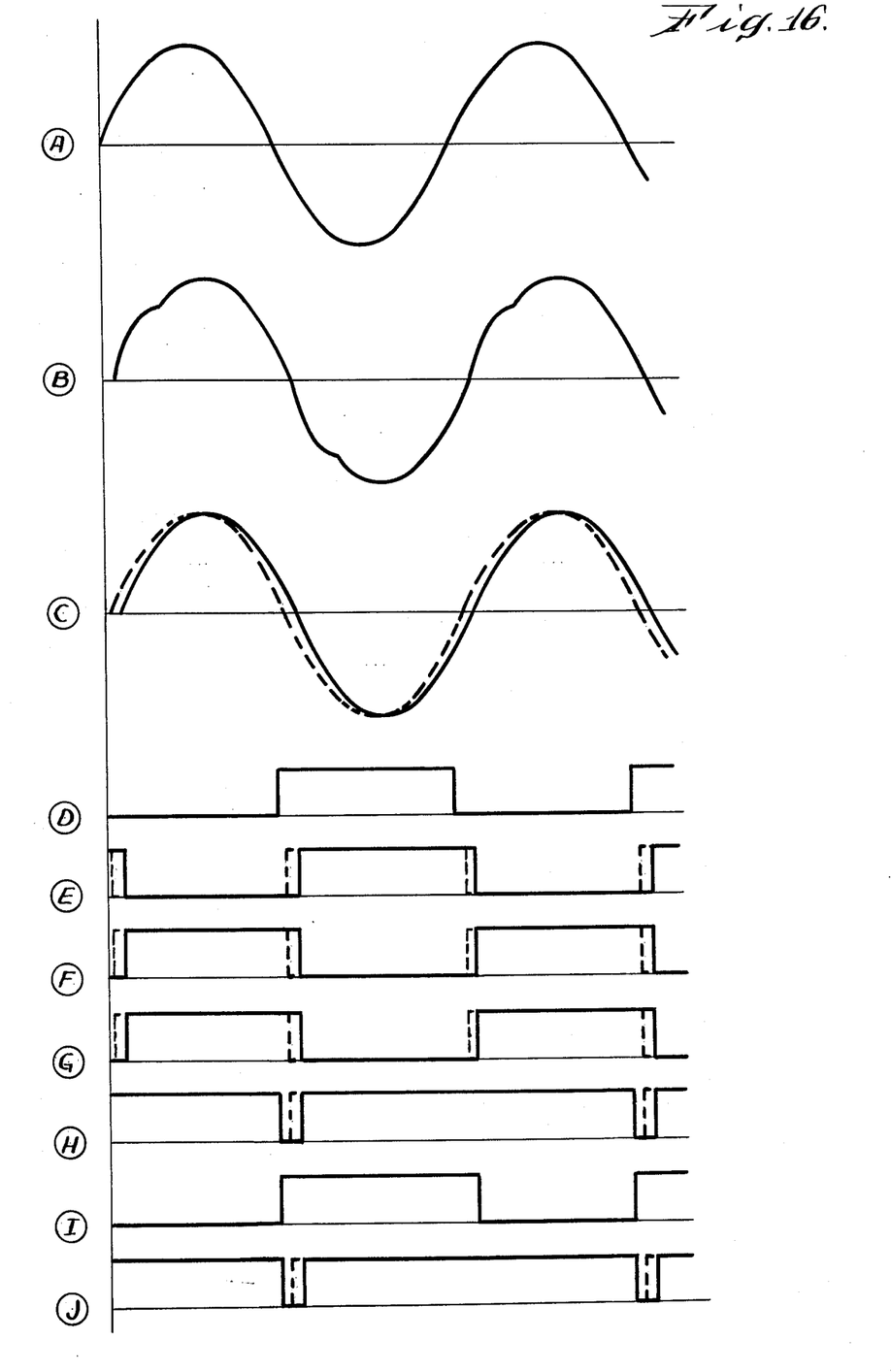
FIG. 16 is a comparison graph of the waveforms taken at the numbered points in FIG. 15.

The current $I_L$ from the line to the primary 30 of the transformer 28 is similarly reduced and is shown in graph B of FIG. 16. The current $I_L$ waveform is slightly irregular due to the overlap operation of the power circuit 10, as previously explained. This current waveform is sent to a filter 162 which removes the irregularities and produces the solid sinusoidal current waveform shown in graph C of FIG. 16. This sinusoidal current is then sent into a second zero detect circuit 165 which outputs the positive solid pulsetrain of graph E of FIG. 16. As can be seen by a comparison of graphs D and E, the current pulsetrain lags the pulsetrain for the voltage. This lag reflects the difference between the time at which the voltage $V_L$ crosses zero and the time at which the current $I_L$ crosses zero, or in other words, the difference in phasing between $V_L$ and $I_L$ which can be seen by a comparison of graphs A and B of FIG. 16.

The current pulsetrain from the zero detect circuit 165 is sent to an inverter 169 which inverts so that it becomes the negative pulsetrain shown in graph F of FIG. 16. This pulsetrain from the inverter is then sent to a first flip flop 172 where it is inputed, as shown in FIG. 15. A triggering pulse is inputed on the reset of the first flip flop 172, and the output is the waveform shown in graph G of FIG. 16.

The output from the first flip flop 172 is fed back to a NAND gate 168 where it is combined with the voltage pulsetrain out of the zero detect circuit 164. A NAND gate always gives a high output except when all of its inputs are high. Therefore, when the current pulsetrain of graph G is combined with the voltage pulsetrain of graph D, the output of the NAND gate 168 is the waveform as shown in graph H of FIG. 16 which is always high except for a very narrow negative pulse. The width of this pulse depends upon the difference in the respective crossover times of the voltage $V_L$ and the current $I_L$. As the voltage and current approach in phase operation, the negative pulse out of the NAND gate 168 becomes narrower.

This output pulse of the NAND gate 168 is fed into a second flip flop 171. The second flip flop 171 is reset by the same triggering pulse as received by the first flip flop 172. The output of the flip flop 171 is shown by the pulsetrain in graph I of FIG. 16. This pulsetrain from the second flip flop 171 is then combined with the output of the first flip flop 172 in a second NAND gate 174. The NANDING of these pulsetrains results in the negative pulses shown in graph J of FIG. 16. The width of the negative pulse of graph J depends entirely upon the time difference between the zero crossover point of the voltage $V_L$ as compared with zero crossover point of the current waveform $I_L$. As indicated in FIG. 16, if the current $I_L$ is more nearly in phase with the voltage $V_L$, as shown by the dashed waveform of graph C, the resultant pulse width out of the second NAND gate 174 will be reduced as shown by the dashed pulse in graph J.

The pulses from the second NAND gate 174 are sent into an integrator 175 which outputs a voltage level inversely proportional to the width of the pulse. The narrower the pulse width the greater the output voltage of the integrator 175. The wider the pulse width from the second NAND gate 174 indicating a greater phase discrepancy between the voltage and the circuit and thus operation further away from resonance, the smaller the voltage output from the integrator 175.

The voltage from the integrator 175 is fed into a regulator 178 which compares the integrated voltage level with that of a set voltage $V_R$. The voltage $V_R$ can be adjusted by means of a potentiometer 177. If the integrated voltage is the same or higher than the $V_R$ comparison voltage, the regulator sends a signal to the SCR logic circuit 50 which inhibits its input or increase in the frequency control. The regulator 178, in effect, overrides the input into the SCR logic circuit 50 and the frequency of the gating pulses to the inverter module 40 cannot be increased. On the other hand, if the integrator voltage is less than the comparison voltage $V_R$, the regulator 178 sends no signal to the SCR logic circuit 50. The frequency, therefore, can be increased by means of the input to the SCR logic circuitry 50. As the frequency is increased under these conditions, the resonance condition or maximum power is approached and the pulse width from the NAND gate 174 becomes narrower as the voltage $V_L$ and the current $I_L$ become more nearly in phase. As a result, the pulses from the second NAND gate 174 of the peak power detect circuit 160 become narrower and the integrated voltage from the integrator 175 correspondingly becomes greater. This process continues as the frequency is further increased, until voltage from the integrator 175 equals or exceeds the comparison voltage $V_R$. As previously explained, this turns on the regulator 178 which effectively overrides any further inputs to the SCR logic circuit 50 attempting to increase the frequency. The frequency, however, may still be lowered.

It should also be noted that this peak power detect circuit 160 prevents operation at frequencies above resonance as the first NAND gate 168 acts as an inhibitor when the current leads the voltage in terms of phase. Further, this circuit 160, by having the regulator 178 essentially disable and override any frequency control increases to the SCR logic circuit 50 when resonance is reached, eliminates the problem in the prior art that the operator might go beyond resonance in adjusting the power circuit 10 with a resulting loss in power.

The peak power detect circuit 160 thereby provides the means for automatically insuring the operation of the power circuit 10 at maximum conditions. Since the load 35 may be dynamic and may change characteristics during the process resulting in a corresponding change in operating conditions, the peak power detect circuit 160 enables corrections to be made and operation easily maintained at or near resonance.

Throughout this description, it should be obvious that the protective circuits could be connected to monitor other portions of the power circuit without departing from the scope and spirit of the invention. From the foregoing description of the invention, the numerous advantages and improvements incident to the invention will now be apparent to those skilled in the art.

Accordingly, the above description of the invention is to be construed as illustrative only, rather than limiting and this invention is limited only by the scope of the following claims.

We claim:
1. A high voltage, induction heating, power circuit for supplying a high current to a load, said power circuit comprising:
   a. a source of electrical potential having a positive and a negative terminal;
   b. an inverter module in series with said source of electrical potential, said inverter module being comprised of a first section and a second section, each of said sections being comprised of
      1. at least one thyristor gatable to conduct in a first direction
      2. at least one diode means connected in parallel with said thyristor and conducting in the opposite direction, so that alternate current paths through said inverter module section are provided,
      3. a saturable reactor in series with said diode means, said saturable reactor placing a reverse voltage across the thyristors when the diode means begins conduction, said saturable reactor also limiting the rate of rise of the voltage across said respective thyristor when said thyristors have turned off, and
      4. a snubber connected in parallel with said thyristor, said snubber being comprised of a series connected resistor and capacitor and operating to limit the rate of rise of voltage across the thyristor when said thyristor has turned off;
   c. an SCR logic circuit for selectively providing gating pulses to said thyristors of said inverter module, each of said thyristors becoming conductive when receiving a gating pulse;
   d. a first inductance series connected with said positive terminal of said source of electrical potential and said first section of said inverter module;
   e. a second inductance series connected with said negative terminal of said source of electrical potential and said second section of said inverter module;
   f. a pair of series connected charging capacitors connected in parallel with said inverter module between said first and second inductances and said source of potential;
   g. a load connected from between said charging capacitors to between said first and second sections of said inverter module;

whereby said power circuit is in operation, current flows through one current path of said first section of said inverter module, through said load and through said series capacitors thereby charging them, said capacitors then discharging and sending current back through said load and through said alternate current path in said first section of said inverter module, the operation then being repeated with said second section of said inverter module, and whereby when the SCR logic circuit provides gating pulses at sufficiently high frequency, said thyristor of said second section begins conduction while said diode means of said first section is still conducting, thereby diverting current from the alternate current path in said first section to the thyristor current path of said second section, the operation then being repeated with the said second section of said inverter module, the snubber limiting the rate of rise of the forward blocking voltage of the thyristor and the saturable reactor sweeping the thyristor clean to reduce its turn off time and also limiting the rate of rise of the forward blocking voltage of the thyristor, thereby reducing power loss in the snubber.

2. A power circuit as defined in claim 1 wherein each section of said inverter module is comprised of a pair of series connected thyristors and a diode in series with a saturated reactor being connected across each thyristor.

3. A power circuit as defined in claim 1 wherein each section is comprised of a pair of series connected thyristors, and a diode in series with a saturated reactor being connected in parallel with said pair of thyristors.

4. A commutation failure protection circuit which senses a voltage collapse condition across a filter capacitor of a DC buss which feeds an inverter circuit consisting of sequenced switches and LC circuits controlled by said switches, and which provides direct current transfer while maintaining voltage isolation from said inverter module where the voltage collapse occurs, said commutation failure protection circuit comprising a Hall device whose output voltage is proportional to its input current, means for comparing the output voltage of said Hall device with a selectively set voltage and means for sending an output signal from said commutation failure protection circuit depending upon the magnitude of the output voltage of said Hall device in comparison with said set voltage.

5. An improvement in a circuit comprising a gated thyristor conducting in a first direction and a diode connected in parallel with the thyristor and conducting in a second direction to provide alternate current paths occuring at high frequency, the improvement comprising a saturable reactor in series with the diode and a snubber in parallel with the thyristor, the snubber comprising a series connected resistor and capacitor operating to limit the rate of rise of the forward blocking voltage of the thyristor when the circuit is conducting in the second direction and the saturable reactor sweeping the thyristor clean to reduce its turnoff time and also limiting the rate of rise of the forward blocking voltage of the thyristor, thereby reducing power loss in the snubber.

6. A high voltage inductance power circuit for supplying a high current to a load, said power circuit comprising:
a. a source of electrical potential having a positive and a negative terminal;
b. an inverter module in series with said source of electrical potential, said inverter module being comprised of a first section and a second section, each of said sections being comprised of at least one thyristor in parallel with at least one diode means so that alternate current paths through each of said inverter module sections are provided;
c. an SCR logic circuit selectively providing gating pulses to said thyristors of said inverter module, each of said thyristors becoming conductive when receiving a gating pulse;
d. a pair of series connected charging capacitors connected in parallel with said inverter module and said source of electrical potential;
e. a load connected from between said charging capacitors to between the first and second sections of the inverter module;
f. a first inductance connected in series with the positive terminal of said source of electrical potential, the first section of the inverter module and said load;
g. a second inductance connected in series with the negative terminal of said source of electrical potential, the second inverter section of said inverter module and said load;
h. a filter capacitor connected across said source of electrical potential, and a high impedance device connected between the power source and the filter capacitor, said high impedance device instantaneously decoupling the filter capacitor from the source of electrical potential in the event of a short circuit in said inverter module, the voltage on said filter capacitor being a constant unless a short in said inverter module occurs which causes the filter capacitor voltage to drop substantially as the filter capacitor initially discharges;
i. a commutation failure protection circuit connected across said filter capacitor, said commutation failure protection circuit detecting a short circuit through said inverter module by sensing the voltage collapse which accompanies such a short circuit, acting to inhibit the gating pulses from said SCR logic circuit thereby making said thyristors nonconductive, and when voltage collapse is detected, said commutation failure protection circuit at the same time maintaining its voltage isolation from said power circuit.

7. A power circuit as defined in claim 6 wherein said high impedance device connected between the source of electrical potential and the filter capacitor is a DC choke.

8. A power circuit as defined in claim 6 wherein said commutation failure protection circuit comprises a Hall device whose output voltage is proportional to the voltage across said filter capacitor, said Hall device providing voltage isolation from said power circuit, means for continuously comparing the output voltage of said Hall device with a selectively set value, and when the output voltage falls below said set value indicating a voltage collapse because of a short circuit through said inverter module, said comparison means sends a signal to said SCR logic circuit inhibiting gating pulse to said thyristors.

9. A power circuit as defined in claim 6 wherein said commutation failure protection circuit comprises an optical coupler having an input diode, said input diode being connected across said filter capacitor so that the current into said input diode is proportional to the voltage across said filter capacitor, the current in said input diode turning on a transistor which is voltage isolated from said input diode, said transistor having an output voltage inversely proportional to the magnitude of said current in said input diode, means for continuously comparing said output voltage of said transistor with a selectively set value, and when the output voltage increases above the set value, indicating a voltage collapse and a short circuit through said inverter module, said comparison means sends a signal to said SCR logic circuit inhibiting gating pulses to said thyristors.

10. A high voltage inductance power circuit for supplying a high current to a load, said power circuit comprising:
a. a source of electrical potential having a positive and a negative terminal;
b. an inverter module in series with said source of electrical potential, said inverter module being comprised of a first section and a second section, each of said sections being comprised of at least one thyristor in parallel with at least one diode means so that alternate current paths through each of said inverter module sections are provided;

c. an SCR logic circuit selectively providing gating pulses to said thyristors of said inverter module, each of said thyristors becoming conductive when receiving a gating pulse;

d. a pair of series connected charging capacitors connected in parallel with said inverter module and said source of electrical potential;

e. a load connected to said power circuit through a load transformer, said transformer having a primary winding and a secondary winding, said primary winding being connected from between said charging capacitors to between the first and second sections of the inverter module, and said load being connected across said secondary winding;

f. a first inductance connected in series with the positive terminal of said source of electrical potential, the first section of the inverter module and said load;

g. a second inductance connected in series with the negative terminal of said source of electrical potential, the second inverter section of said inverter module and said load;

h. a peak power detect circuit connected to said power circuit, said peak power detect circuit continuously comparing the phasing of the voltage and the current in said power circuit to determine if said power circuit is operating at or near its resonance condition which occurs when both the voltage and the current are in phase and which provides the maximum output power, said peak power detect circuit acting to override any frequency increase from said SCR logic circuit when desired operating conditions are achieved, said peak power detect circuit sensing the sinusoidal current in the line to said primary winding of said load transformer and converts said current to a pulsetrain, said peak power detect circuit also being connected across said secondary winding and sensing the sinusoidal voltage therein which it also converts to a pulsetrain, logic means for comparison and combination of said current pulsetrain and said voltage pulsetrain so that a pulse is generated whose width corresponds to the difference in phase between the voltage and current in said power circuit, said pulse being fed to an integrator which produces an output voltage of inverse proportion to the width of the input pulse, means for continuously comparing the integrator output voltage with a selectively set voltage level, and means for sending a signal to said SCR logic circuit overriding any increase in frequency changes when the integrator voltage equals or exceeds the set voltage level.

* * * * *